(12) United States Patent
Ramirez

(10) Patent No.: US 9,396,866 B2
(45) Date of Patent: Jul. 19, 2016

(54) BLOCKER OF GEOMAGNETICALLY INDUCED CURRENTS (GIC)

(71) Applicant: Alberto Raul Ramirez, Miami, FL (US)

(72) Inventor: Alberto Raul Ramirez, Miami, FL (US)

( * ) Notice: Subject to any disclaimer, the term of this patent is extended or adjusted under 35 U.S.C. 154(b) by 0 days.

(21) Appl. No.: 13/998,462

(22) Filed: Nov. 4, 2013

(65) Prior Publication Data

US 2015/0124356 A1    May 7, 2015

(51) Int. Cl.
  *H01F 27/34*  (2006.01)
  *G05F 3/04*   (2006.01)
  *H02H 3/16*   (2006.01)
  *H02H 9/08*   (2006.01)

(52) U.S. Cl.
  CPC *H01F 27/34* (2013.01); *G05F 3/04* (2013.01); *H02H 3/165* (2013.01); *H02H 9/08* (2013.01)

(58) Field of Classification Search
  CPC ......... H02H 7/04; H02H 9/004; H02H 3/165; H02H 9/08; H01F 27/34; G05F 3/04
  See application file for complete search history.

(56) References Cited

U.S. PATENT DOCUMENTS

| | | | | |
|---|---|---|---|---|
| 3,348,097 | A * | 10/1967 | Lemens | 361/17 |
| 5,179,489 | A * | 1/1993  | Oliver | 361/35 |
| 5,751,530 | A * | 5/1998  | Pelly et al. | 361/56 |
| 6,188,552 | B1* | 2/2001  | Jaeschke et al. | 361/48 |
| 7,589,943 | B2* | 9/2009  | Ramirez et al. | 361/35 |
| 2005/0201027 | A1* | 9/2005 | Arashima et al. | 361/56 |
| 2012/0019962 | A1* | 1/2012 | Faxvog et al. | 361/1 |
| 2012/0081097 | A1* | 4/2012 | Birnbach | G05F 1/10 323/304 |

OTHER PUBLICATIONS

Alberto Ramirez et al., Addressing Ground-Induced-Current (GIC) Transformer Protection, Paper A2-110, CIGRE45 World Conference, Paris, France, Aug. 2014.

\* cited by examiner

*Primary Examiner* — Zeev V Kitov
(74) *Attorney, Agent, or Firm* — Hector M Reyes Rivera

(57) ABSTRACT

A device for mitigation Geomagnetic Induce Currents in the power distribution network is described. It may be connected to the neutral of a star-connected three-phase transformer of the power distribution system to ground without compromising its basic insulation, operation or integrity of the system. It requires a circuit having a surge arrester resistor having an adaptive nonlinear negative volt-ampere which is inserted from the transformer neutral to ground and a ground switch connected to the ground and also connected to the surge arrester.

The device has two different current paths: whenever there is no GIC the switch remains closed and current flows from the transformer to the ground via the ground switch. Under Geomagnetic Induce Currents, the ground switch opens, allowing the induced current to flow from the transformer to the ground via the surge arrester. The device is formulated and designed according to IEEE/ANSI/NEMA recommended insulation coordination guidelines in order to sustain proper protective margins to the equipment neutral basic insulation levels (BIL, BSL).

5 Claims, 4 Drawing Sheets

BLOCKER OF GEOMAGNETICALLY INDUCED CURRENTS (GIC)

TECHNICAL FIELD

This invention is directed to a device useful in mitigating the Geomagnetically Induced Currents (GIC) in a transformer apparatus of an AC power distribution network in order to avoid the potential damage caused by such currents.

BACKGROUND

In its most common form, Geomagnetic Induced Currents (GIC) is a well-known phenomenon that takes place as a consequence of Geomagnetic Disturbances (GMD), caused by either solar winds or intended electromagnetic pulses EMP. These shock waves can interact with the conductors of transmission and distribution circuits; such interaction causes, according to the laws of physics, the induction of currents in these circuits. Once the GIC flows in the network, it reaches the power transformers as well as the instrument transformers, shunt reactors and phase shifters connected to the transmission lines, entering through their phase connections and returning from their earthed neutral. The most important effects are related to the saturation of those apparatus' magnetic circuitry. In general, it may cause wave distortion and equipment overheating. Possible outcomes of this disturbance are the malfunction of protective systems and/or failure as well as a deterioration of the grid's performance, including voltage collapse; for a detail discussion on GIC and its effects on the power distribution system see: (1) Pirjola, R., *Geomagnetically Induced Currents During Magnetic Storms; IEEE Transactions on Plasma Science*, Vol. 28, Issue 6, and December 2000 pp. 1867-1873 and (2) Bozoki, B., et al. *The Effects of GIC on Protective Relaying, IEEE Trans Power Delivery*; Vol. 11, pp 725-739, 1996. The described phenomenon poses such a major threat to the electric power grid that it has captured attention at the highest levels of the US Federal Government. In particular it must be recognized the creation in 2002 of the EMP Commission of the US Congress devoted to assess the Threat to The US from Electromagnetic Pulse Attack-Critical National Infrastructures. A comprehensive document regarding a full discussion of the GIC problem at national level by the cited EMP Commission may be found in *Report of the Commission to Assess the Threat to the US From Electromagnetic Pulse Attack-Critical National Infrastructures*, April 2008.

The prior art presents alternatives to the problem of protecting the power system from the GIC phenomenon. In general it can be said that in most cases mitigation devices proposed to be inserted between the neutral of the transformer and ground, i.e. in the trajectory followed by the GIC currents; so that such an insertion produces either a reduction or plainly a total blockage of such induced currents. One example could be found in U.S. Pat. No. 8,035,935, wherein such mitigation is achieved by means of a neutral grounding resistor connected from the neutral of the transformer to ground such that those GIC currents experience a sizable reduction. This approach, while relatively simple, cost-effective and safe from the system's standpoint given the fact resistors apparatus are passive devices which can be switched on/off simply and trouble free, they can still present some shortcomings. First, the attainable reduction of GIC is relative and depends on the resistor rating, and therefore size and cost. Moreover, resistor ratings are typically based on a 10-second deployment which poses a thermal concern if the deployment requires a time period longer than 10 seconds.

A second approach is based on neutral blocking capacitors, connected from the neutral of the transformer to ground such that those GIC currents get fundamentally blocked. This approach has been discussed for two decades now and is the subject of US Patent applications in Faxvog et al, 2012-0019962 A1 and Faxvog et al, 2012-0019965 A1. The capacitor insertion, as described, becomes thus a GIC blocker because of the very low frequency (quasi DC) nature of the GIC currents. However, a real number of pitfalls can be associated to this approach; first and foremost, switching of power capacitors is well known to be quite problematic because of the huge transient currents these devices can cause compelling a need to discharge them after switching the unit off. The latter implies the requirement for several functionalities, specifically to deal with this issue. Secondly, a problem stemming from the fact that the capacitor is placed in series with the transformer Y winding, on its neutral/ground side, and therefore in series with the transformer's non-linear magnetizing reactance, thus posing a number of design challenges; notably because of the problematic proneness to ferroresonance i.e. a series LC resonant condition that can establish itself since resonant tuning is enhanced by the non-linear nature of the transformer reactance that can create, in combination with the capacitor, numerous series oscillatory natural frequencies. Hence this problem requires installing yet a resonance damping resistor in that series circuit; but placing such a resistor brings also all the shortcomings discussed above for the case of the neutral grounding resistor approach and none of its advantages. Thirdly, the presence of a capacitor may be problematic in case a power system ground fault occurs when this device is on, since the capacitor causes a transient DC offset on top of the AC fault current which impedes such current to go through a zero value, as the AC current wave does, complicating substantially the clearance of that AC fault by grid circuit breakers. In addition, capacitor units placed at transformer neutrals may produce various additional well-known hazards such as neutral instability, voltage magnification and even neutral inversion phenomena. In each case more components and functionalities must be incorporated to cope with these problems causing a major impact in cost, size and complexity. In fact the resulting many components, with convoluted functionalities, make difficult to ponder the mitigation device potential failure modes and hence making difficult to arrive at a reasonable failure rate, essential for the power system reliability impact it will cause after installation at a very sensitive power system point.

All these reasons have caused the electric utility industry to be reluctant to adopt this technology, with the end result there is to date not a single installation in the US despite the urgency to protect the electric grid from these serious threats. Thus, there is a need to improve the art of mitigation of geomagnetic induced currents (GIC) in the power systems.

SUMMARY OF THE INVENTION

The invention provides a grounding device that is ready to be electrically and physically connected to a transformer's neutral of a power distribution network or system in order to mitigate Geomagnetically Induced Currents in said power network. The device comprises an electrical circuit, comprising:
  (a) a surge arrester;
  (b) a normally-closed ground switch;
  (c) a first connector for electrically connecting only, exclusively and directly the surge arrester to system neutral or ground section;

(d) a second connector for electrically connecting only and exclusively the normally-closed switch directly to the system neutral or ground section;

(e) a third connector for electrically connecting the surge arrester to the normally closed ground switch;

(f) a forth connector for electrically connecting the third connector to the transformer star winding neutral grounding section.

Said surge arrester avoids the requirement to have any other specific power equipment or elements such as capacitors, condensers and/or resistors, since it is exclusively committed to blocking Geomagnetically Induced Currents. Said surge arrester is preferably a metal oxide surge arrester. The herein disclosed invention provides a device that is simple, passive, size convenient, easy to install, highly cost-effective and energy efficient. Furthermore, its resistive components can be trouble-free switched on/off; it comprises only two standard distribution voltage components, implying a negligible layout change to the transformer substation.

BRIEF DESCRIPTION OF THE DRAWINGS

The foregoing and additional features and characteristics of the embodiments of the present invention will become more apparent from the following detailed description considered with reference to the accompanying drawings, which are used herein in a manner of example only, and wherein.

DETAILED DESCRIPTION OF THE INVENTION

The following detailed description illustrates the invention by way of example and is not limited to the particular limitations presented herein as principles of the invention. This description is directed to enable one skilled in the art to make and use the invention by describing embodiments, adaptations, variations and alternatives of the invention. Potential variations of the limitations herein described are within the scope of the invention. Particularly, the size and shapes of the invention's elements illustrated in the discussion may be varied and still provide embodiments having different sizes or geometric shapes, that are within the scope of the instant invention.

In general terms, the instant disclosure describes a device for protecting power transformers from the deleterious flow GIC or DC currents directly or indirectly caused by Geomagnetic Disturbances, originated by either solar winds or intended electromagnetic pulses EMP. The preferred embodiments of this invention do not contain capacitor apparatus for the purpose of blocking the flow of such currents or for any other purpose.

Figure 1:
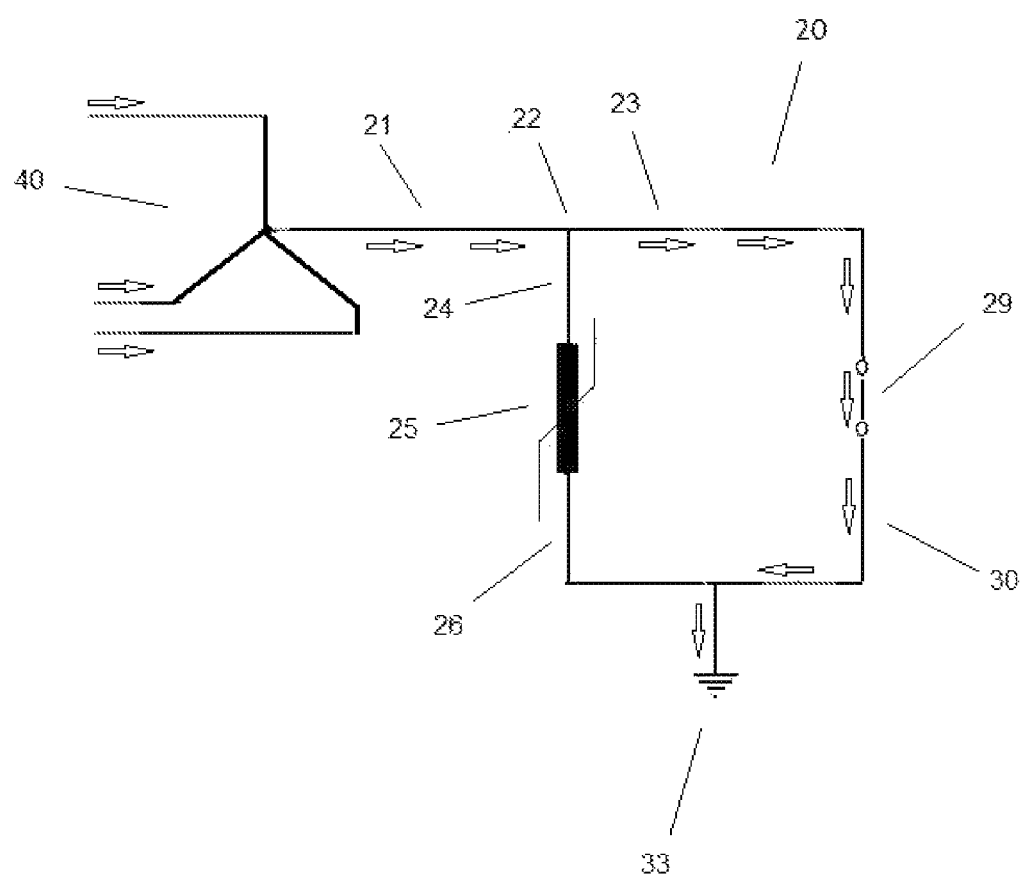
FIG. 1 illustrates schematic representation of the circuit of the device according to the instant invention, already electrically connected to the neutral power transformer's Y section and showing the essential circuit components, tracing basic current flow path when the ground switch is in its normally-closed state.
Figure 2:
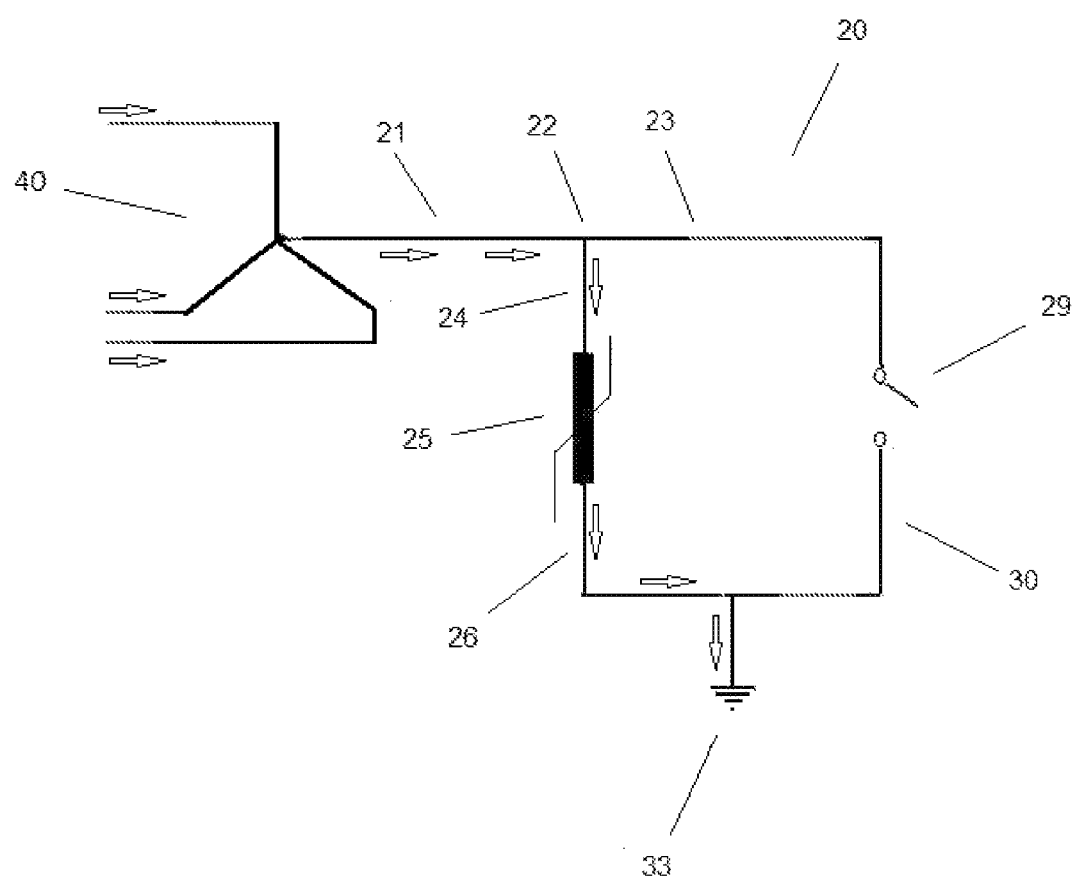
FIG. 2 illustrates schematic representation of the circuit of the device according to the instant invention, already electrically connected to the neutral power transformer's Y section and showing the essential circuit components, tracing basic current flow path when the ground switch is in its open state.

More particularly, the preferred embodiment of the instant invention is a device that comprises the circuit illustrated in FIG. 1. Device 20, according to the invention comprises electrical node 22, which is electrically and externally connected to the neutral of Transformer's Y winding section 40 via electrical-wiring branch or electrical connector 21. At the electrical node 22 the circuit, topologically presents two different electrical-wiring branches, first branch 23 and second branch 24. As illustrated in FIG. 1 and FIG. 2, electrical branches 23 and 24 constitute a single connector for electrically connecting surge arrester 25 and ground switch 29.

First branch 23 electrically connects node 22 to normally-closed ground switch 29, which is connected to ground 33 via electrical-wiring branch or electrical connector 30. The electrical connection between ground switch 29 and ground 33 is exclusive and direct, thus allowing the passing of the electrical current from ground switch 29 directly and exclusively to ground 33. As it is illustrated in FIG. 1, first electrical path does not require the use of any DC blocking component such as capacitors or resistors or the like.

Device 20 also comprises a second electrical path, wherein electrical wiring branch 24 connects node 22 to a metal-oxide surge arrester 25; which is connected to ground 33 via electrical-wiring branch or electrical connector 26. As indicated previously regarding the first electrical path already described above, this second electrical path, does not require the use of any DC blocking component such as capacitors or resistors or the like.

As illustrated in FIG. 1 and FIG. 2, the device 20 comprises two distinct transformer neutral grounding paths for current to follow. Each of said paths is illustrated with arrows on each respective FIGS. 1 and 2. The first one, illustrated in FIG. 1, shows the circuit having a normally-closed ground switch 29, and the second one, illustrated in FIG. 2, shows the circuit having ground switch 29 open, wherein the surge arrester 25 has the dual function of protection from power system ground disturbances and blocking geomagnetic induced currents. In other words, FIG. 2 illustrates the alternative circuital-path of transformer ground currents, when the ground switch 29 is at an open status, whereby GIC currents must traverse surge arrester 25 to reach ground 33. Such situation takes place under Geomagnetic Disturbances or under the highly unlikely case of a simultaneous Geomagnetic Disturbances and power-system ground disturbances takes place.

Figure 3:
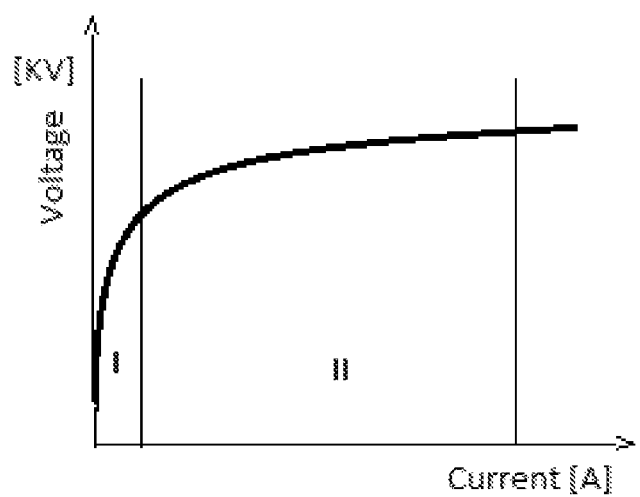
FIG. 3 presents a graphic showing the voltage-current characteristic of a typical metal-oxide surge arrester.
Figure 4:
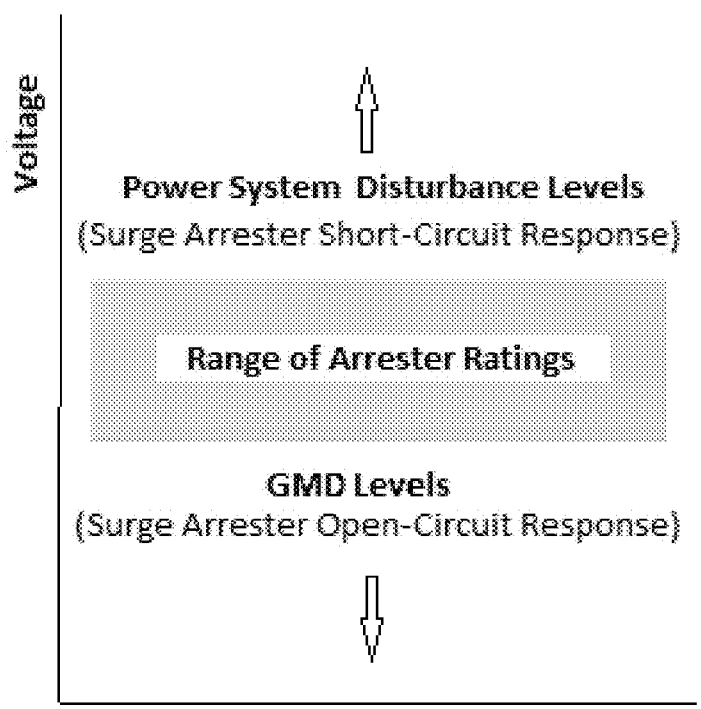
FIG. 4 Illustrates the comparative effects of voltage ranges associated to both power system ground disturbances and GIC currents caused by GMD waves.

Regarding surge arrester 25, it is important to indicate that it responds to the two basic wave types impinging the transformer and that its functionality renders the use of capacitor apparatus unnecessary, redundant and superfluous. First, and as well known, the metal-oxide surge arrester is basically a device presenting a non-linear relationship between cause (voltage) and effect (current), establishing a sort of non-linear resistance; FIG. 3 illustrates that relationship presenting thus such variable resistance to impinging waves; the specific resistance at any particular operating point can be associated to the steepness of such a curve at that point; consequently, minding the voltages associated to ground fault disturbances of the extra-high voltage electric grid are substantial in magnitude; this type of solicitation then sets an operating point well into the saturated interval, region II of FIG. 3; for this condition the resistance is very small; hence it can be stated that for voltages associated to power system disturbances surge arrester 25 will have a response consistent with a near short-circuit condition. On the order hand, the voltages associated to geomagnetic disturbances, while potentially causing major problems of saturation and over-excitation, produce instead voltages predominantly of the low to medium range, setting an operating point in the region I of FIG. 3; for this condition the resistance is very large; hence it can be stated that for voltages associated to geomagnetic disturbances, causing GIC currents, the surge arrester 25 will have a response consistent with a near open-circuit condition. FIG. 4 illustrates the comparative voltage ranges associated to both power system ground disturbances and GIC currents caused by GMD waves; FIG. 4 also shows the viable range of surge arrester ratings adequate for unit 25.

In operational terms, regarding FIG. 1, it shows blocker of geomagnetically induced currents (GIC) device 20 as connected to power transformer's Y winding section 40 for the steady-state normal operating condition i.e. in the absence of any geomagnetic or power system disturbances. For this state the device 20 functions basically as a transformer solid-neutral grounding connection; hence any existent ac power-system ground currents will follow the arrow path shown with in FIG. 1: first traversing branch 21 towards node 22, circulating via wiring branch 23 flowing into and through normally-closed ground switch 29, reaching ground 33 via wiring branch 30.

On the other hand, whenever a GMD disturbance occurs, the GIC current circulation follow the arrow path illustrated in FIG. 2: ground switch 29 opens its contacts, forcing all current circulation into the alternative path of second branch 24, connecting to surge arrester 25 and to ground 33 via branch 26. At this stage the surge arrester 25, as discussed above, becomes a near open-circuit, substantially blocking GIC.

Detection of GMD disturbance detected by any suitable sensing means already used and very well known in the art such as a Hall-Effect Current Transducers (CT) type, which detect GMD disturbances in the power system and send a tripping signal to open ground switch 29, setting the circuit condition illustrated as in FIG. 2.

Regarding the Hall-Effect Current Transducers (CT), it refers to a sensing instrument that uses the Hall-Effect principle of physics whereby a DC current can be detected as it flows through any single conductor. As well known, Current-Transformer units can only pick up AC (or variable) currents. Consequently the Hall-Effect CT provides an accurate DC detection, sparing any need for the traditional alternative i.e. detection of second harmonic/negative sequence of AC waves, a GIC signature, by indirect means. Moreover, the Hall-Effect CT unit does not requires to be necessarily wired electrically into device 20, nor necessarily a part of it; in fact, such sensing unit can preferably be placed outside, physically more closely to the transformer neutral or even at any phase conductor within the transformer circuitry. There may be GIC sensing efficiency, simplicity or dependability issues, but they are not relevant at all to the core of this invention. In all cases the Hall-Effect CT is one reliable means to pick up the GIC currents. This, in turn, produces a tripping signal into the ground switch, which can be conveyed into it in many different ways, including wireless control communications.

Furthermore, the operation of the device 20 herein disclosed for a power system ground fault requires two assumptions; first, that whenever such a disturbance occurs in the absence of GIC, then the current circulation follow the current path shown in FIG. 1, which does not contain a GIC component, ground switch 29 then remains in its normally-closed state; transformer 40 is thus solidly grounded allowing free flow of ground currents with no consequences for transformer 40.

Secondly, whenever the power system ground fault occurs during the period of GIC mitigation of device 20, the current follows the path as illustrated in FIG. 2. For this extremely unlikely case the large neutral voltage associated with the power system ground fault prevails, ground switch 29 then remains in its open state, causing arrester 25 to become a near short-circuit branch allowing a flow of all ground currents onto branch 21 to flow into node 22 and via branch 24 into surge arrester 25 and to ground 33 via branch 26. For this case the ground-fault disturbance temporarily overrides the ongoing GIG mitigation process to allow free flow of ground currents for no consequences for transformer 40. After the power system ground fault event is over, and grid circuit breakers clear the fault, device 20 can be reset.

While the invention has been described in conjunction with some embodiments, it is to be understood that many alternatives, modifications, and variations will be apparent to those skilled in the art in light of the forgoing description. Accordingly, the invention is intended to embrace all such alternatives, modifications and variations falling within the spirit and scope of the appended claims.

What is claimed is:

1. A device for mitigating the Geomagnetically Induced Currents, said device comprising an electrical circuit, said circuit comprising:
   a) a surge arrester;
   b) a normally-closed ground switch;
   c) a first connection for electrically connecting only, exclusively and directly the surge arrester to system neutral or ground section;
   d) a second connection for electrically connecting only and exclusively the normally-closed switch directly to the system neutral or ground section;
   e) a third connection for electrically connecting the surge arrester to the normally closed ground switch;
   f) A forth connection for electrically connecting the third connector to the transformer star winding neutral grounding section and;
   wherein said surge arrester avoids the requirement to have specific power equipment or elements including capacitors, condensers and/or resistors, exclusively committed to blocking Geomagnetically Induced Currents in addition to said surge arrester.

2. The device as recited in claim 1, wherein the surge arrester is a metal oxide surge arrester.

3. The device as recited in claim 1, wherein the surge arrester presents a non-linear relationship between its applied voltage and current.

4. The device as recited in claim 1, which is able to be electrically connected to sensing unit located outside of said device, near the transformer neutral or even at any phase conductor within the transformer circuitry.

5. The device as recited in claim 4, wherein sensing unit said is a Hall-Effect Current Transducers type.

\* \* \* \* \*